United States Patent [19]

Gomolka

[11] 4,317,607
[45] Mar. 2, 1982

[54] COMPARTMENTED CONTAINER

[76] Inventor: William Gomolka, 1 Patriot Dr., Canton, Mass. 02021

[21] Appl. No.: 155,451

[22] Filed: Jun. 2, 1980

[51] Int. Cl.³ .................. A47B 77/08; F25D 11/02
[52] U.S. Cl. .................................. 312/236; 312/296; 312/214; 312/138 A; 62/441
[58] Field of Search .............. 312/236, 296, 214, 250, 312/138 R; 62/441; 109/53, 56

[56] References Cited

U.S. PATENT DOCUMENTS

| | | | |
|---|---|---|---|
| 60,281 | 12/1866 | Taylor | 312/296 |
| 736,449 | 8/1903 | Shanklin et al. | 312/296 |
| 1,222,964 | 4/1917 | Matchette | 109/53 |
| 1,570,009 | 1/1926 | Sanders, Jr. | 312/296 |
| 1,570,427 | 1/1926 | Bie | 312/214 |
| 2,116,619 | 5/1938 | Crosley, Jr. et al. | 312/138 A |
| 2,152,967 | 4/1939 | Martin | 312/236 |
| 2,179,327 | 11/1939 | Evans | 312/296 |
| 2,246,342 | 6/1941 | Brown | 312/296 |
| 2,444,887 | 7/1948 | Wyeth | 312/236 |
| 3,048,462 | 8/1962 | Fisher | 312/296 |
| 3,650,226 | 3/1972 | Conroy et al. | 312/236 |
| 4,059,966 | 11/1977 | True, Jr. | 62/441 |
| 4,070,075 | 1/1978 | Morgan | 312/250 |
| 4,075,866 | 2/1978 | Williamitis | 62/441 |
| 4,123,130 | 10/1978 | Locke | 312/236 |

*Primary Examiner*—Victor N. Sakran
*Attorney, Agent, or Firm*—Wolf, Greenfield & Sacks

[57] ABSTRACT

The container is in the form of an insulated housing with a front wall having a plurality of apertures therethrough with a plurality of container drawers supported in the housing, each drawer being insertable through one of the apertures. Each drawer is supported by means of parallel disposed guide rails for permitting sliding movement of the drawer through the aperture between a closed position and an extended position. Each drawer preferably comprises a solid insulated front panel, a solid rear insulated panel having openings for accommodating the guide rails, along with two sides and a bottom that are perforated or made from a screen material, thus forming a rectangular container.

9 Claims, 11 Drawing Figures

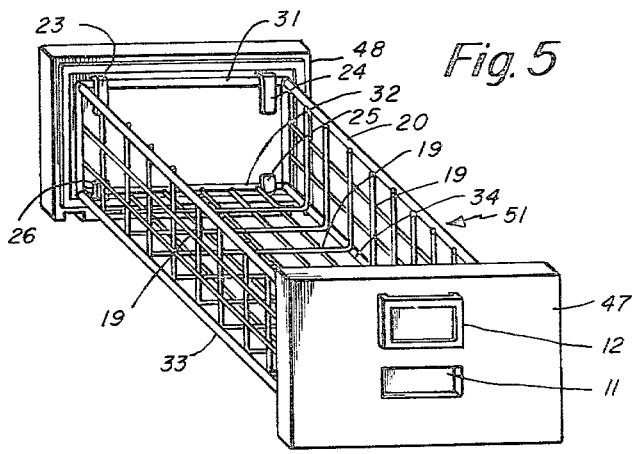
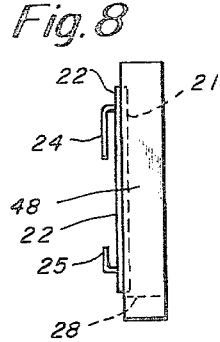
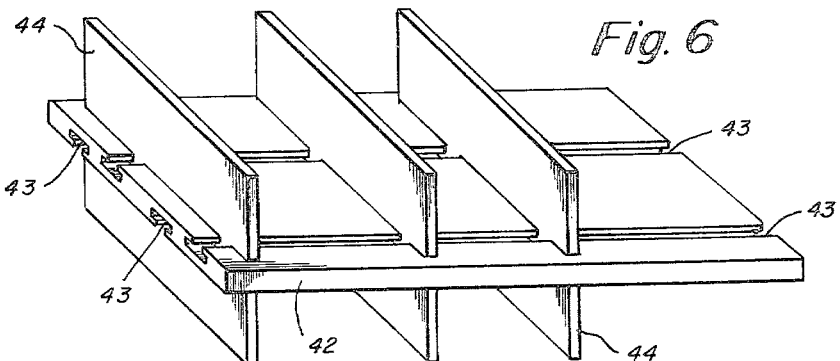
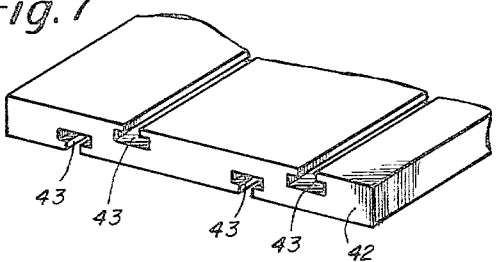
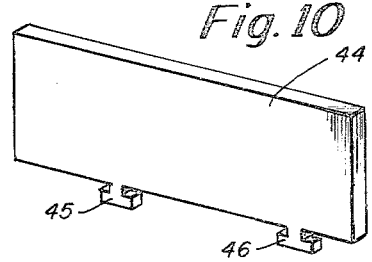
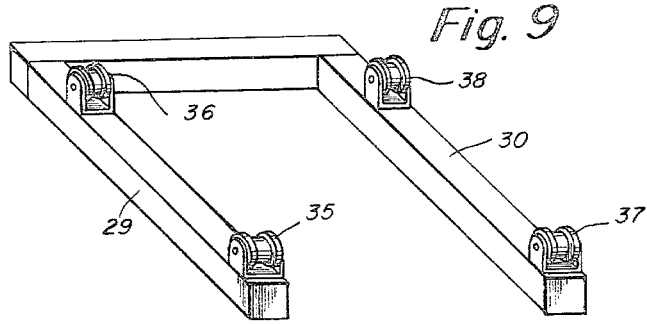
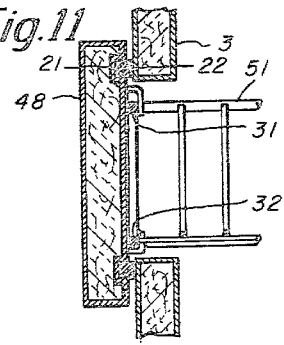

COMPARTMENTED CONTAINER

BACKGROUND OF THE INVENTION

The present invention relates in general to an improved compartmented container. More particularly, the container of this invention may be used either as a refrigerator or a heat container.

There presently exists a number of devices that are designed to store products at predetermined temperatures. However, these devices are generally very inefficient because they consume substantial amounts of energy and are expensive to operate. These known devices generally employ a relatively substantial door for opening the entire device. This makes their use uncomfortable in that in order to select a product, a person must be exposed to the cold or heat.

Furthermore, to remove an item from the refrigerator, the whole door must be opened allowing cold air to escape, in the case of a refrigerator, and at the same time permitting warm air to penetrate into the refrigerator. Moreover, in many cases, an item to be removed is located at the rear of the refrigerator behind other items obstructing the view. When the item is located, it is not easy to reach and, therefore, removal of obstructing items is necessary to provide direct access to the item one wishes to select. Thus, the whole procedure is time consuming and very energy inefficient.

There presently exists drawer arrangements and rotating shelves within a refrigerator. However, these still require the main door of the refrigerator to be opened and, thus, there is no barrier to prevent the cool air from escaping and the warm air from penetrating to uninsulated drawers and the exposed portion of the remainder of the refrigerator. Furthermore, the rotating shelf concept is generally too fragile to support heavy items, and due to its generally round configuration, there is a considerable loss of space.

Also, in connection with a freezer, there is presented an even greater problem. If the item that is desired is located on the bottom of the freezer and many items are packed thereover, selection is virtually impossible.

In refrigerator units that are employed in supermarkets and other stores or commercial establishments, there is a substantial energy loss which, of course, means an attendant saving loss. These freezers generally are wide open causing a cooling of the building while many times heating systems are operating concurrently therewith. This is highly inefficient.

Accordingly, one general object of the present invention is to retain the use of energy and provide an improved and more convenient and efficient means for the refrigeration and freezing of food or other items. In accordance with the present invention the container that is provided maintains food or any other material at a well-controlled temperature in spite of the fact that there may be frequent access to the inside of the container.

Another object of the present invention is to provide a container preferably used as a refrigerator and which is characterized by a considerable saving in electricity or any other energy. In the preferred embodiment of the present invention a plurality of drawers are used instead of the large door, with each drawer preferably being assigned a particular type of product.

Another object of the present invention is to provide a refrigerator or the like which is constructed to prevent excessive change in temperature within the container during storage and removal of items therefrom.

Still another object of the present invention is to provide a container having more efficient use of storage space and one which is, therefore, capable of accommodating substantially more items than can be accommodated by existing containers presently on the market. This means that for the same size outer dimension container, more material can be stored therein.

A further object of the present invention is to provide a container which facilitates the storage of food or any other substance for domestic, as well as for any industrial or hospital applications.

Another object of the present invention is to provide a container that will operate much more efficiently from an energy standpoint and which can be used to eliminate the open types of freezers presently employed in supermarkets and other establishments.

A further object of the present invention is to provide a container preferably in the form of a refrigerator and which is adapted to permit speedy storage and removal of desired items or products from the container.

A further object of the present invention is to provide a container that enables a considerable speeding up of the finding of items that are stored therein.

Another object of the present invention is to provide a container that maintains a relatively uniform temperature therein even though the container is subjected to substantial usage by placing and removal of items therefrom.

Still another object of the present invention is to provide a container that is constructed to prevent spoiling of items which is many times occasioned by the frequent access to the container.

Another object of the present invention is to provide a container that prevents spoilage of items which may be stored longer than they should have been. In this regard, there is a unique identification system in accordance with this invention that clearly indicates the position of all items stored in the container.

Another object of the present invention is to provide a container that provides easy access to frozen items without disturbing the entire contents of the freezer.

Another object of the present invention is to provide a container that is adapted for easy maintenance and cleaning.

Still another object of the present invention is to provide a container that is readily adapted to the cleaning of only portions thereof without interference with the rest of the container.

Another object of the present invention is to provide a container that enables time saving in that only sections of the container, including only some of the drawers require cleaning.

Another object of the present invention is to provide a container that can be properly cleaned and defrosted when necessary without requiring the shutting off of the entire apparatus. It is believed that this will substantially prolong the life of the container by eliminating these frequent on and off power operations.

A further object of the present invention is to provide a container that is much more convenient to use and that it does not require the opening of the large door but instead simply the sliding of a drawer or the like.

Another object of the present invention is to utilize storage space more efficiently than in a conventional refrigerator.

Another object of the present invention is to maintain refrigerator operation while cleaning a compartment without any interference with the rest of the container.

Another object of the present invention is to save considerable electrical or any other energy, by using a drawer instead of a large door for storage.

SUMMARY OF THE INVENTION

To accomplish the foregoing and other objects of this invention, there is provided a compartmented refrigerator comprising an insulated housing that may be sectioned into a refrigerator section and a freezer section and which may insulated from each other. The concepts of this invention may also be employed in constructing a freezer. The front panel of the apparatus has a plurality of the same or different size apertures through which refrigerator drawers extend. Each of the drawers are supported such as by guide rails within the housing but may be moved between a closed position and an extended position. Each drawer, which is inserted through one of the apertures in the front panel, is defined by porous side and bottom sections which may be made of a screen or mesh material, and insulated front and rear panels. The solid insulated front panel is preferably provided with an external indexing plate or label which can be used to identify the products or items that will be stored within that drawer. The perforated or screened sides and bottom have the front and rear panels secured thereto. The screen material is preferably at least partially rigid to form a fixed container that is self supporting even if the front and rear panels are removed. The rear panel is preferably provided with openings for receiving the sliding rails for guiding the drawer. Both front and rear panels preferably include an indentation for receiving a rubber gasket or seal so that the container may be maintained in a sealed position regardless of whether the drawer is open or closed. In this regard the sealing gasket on the front and rear panels are in a facing relationship. Both panels are larger in width and height than the corresponding aperture in order to seal the refrigerator or freezer, as previously mentioned regardless of whether the drawer is fully extended or fully engaged. The size of the drawers may vary depending on the size of the items that are desired to be stored therein. A removable rack is also provided. This may be constructed from channels or other type of material attached by screws or by clamping to the inside of the refrigerator or freezer. This rack comprises a carrier for the rails on which the drawers slide.

BRIEF DESCRIPTION OF THE DRAWINGS

Numerous other objects, features and advantages of the invention should now become apparent upon a reading of the following detailed description taken in conjunction with the accompanying drawings, in which:

FIG. 5 shows a perspective view of an assembled drawer;

FIG. 6 is a perspective view of a divider rack that may be incorporated in the container;

FIG. 7 is a sectional view showing the base for the divider rack;

FIG. 8 is a side view of the back panel depicted in FIG. 4;

FIG. 9 shows a rail arrangement upon which a drawer may be supported;

FIG. 10 shows one of the divider walls employed in the divider rack; and

FIG. 11 is an elevation view of the drawer showing the rear panel sealing to the door when the door is in its open position.

DETAILED DESCRIPTION

Figure 1:
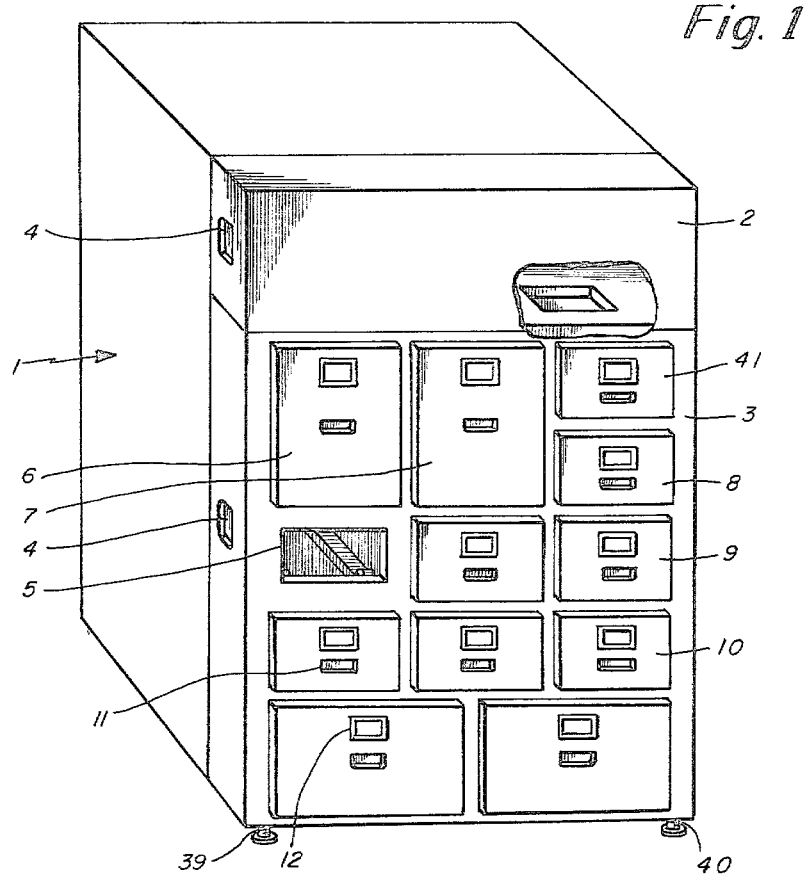
FIG. 1 is a perspective view showing a compartmented container embodying the principles of this invention.
Figure 2:
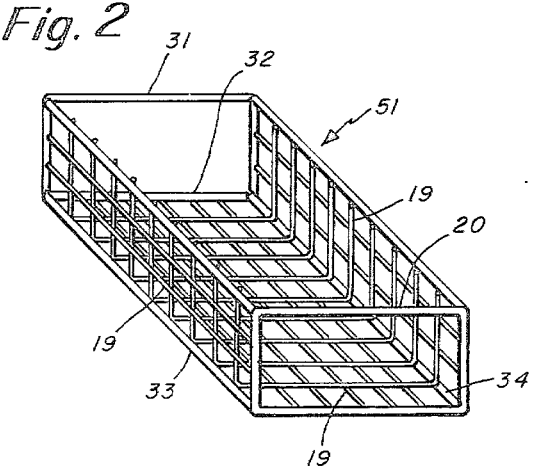
FIG. 2 is a perspective view showing a portion of a drawer of the container including the three-sided perforated receptacle.

Referring now to the drawing, there is shown a preferred embodiment of the compartmented container of this invention used as a refrigerator for food items or products. FIG. 1 is a perspective view of the container 1 which may be made from metal or any other suitable material. The basic container is well insulated by an insulating material in the walls of the container. At the front of the container there may be mounted one or more doors or panels closing the container and defining one or more internal chambers. In the embodiment of FIG. 1 there is shown a small door 2 that is absent any apertures and a larger door 3 therebelow having a plurality of apertures. In place of the doors 2 and 3 there may instead be provided removable panels. When doors are employed, of course, then they are supported by hinges which are not shown in FIG. 1. Both doors may be opened by activating a lever (not shown) in the recess 4. The lever secures the doors closed and prevents accidental opening of the doors. These levers are also preferably designed so that the doors can be opened from inside the container. With regard to the lower door 3, this door is only permitted to hinge open when the drawers associated therewith are removed or in their extended position. The drawer construction is discussed hereinafter.

The levers mentioned previously for operating the doors may also be replaced by a magnetized rubber around the doors. Furthermore, as indicated previously, the doors may be replaced by panels. These panels are affixed permanently to the container but may be readily removed by a quick release latch or clamp.

Figure 3:
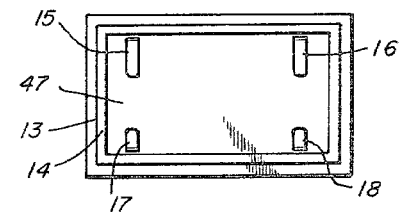
FIG. 3 is a rear view of the front panel of the drawer.
Figure 4:
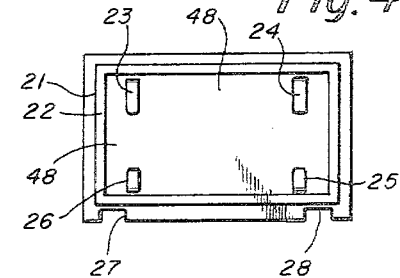
FIG. 4 is a rear view of the back panel of the drawer.

In case of the use of either a door 3 or a panel in substitution therefor, either the door or the panel is provided with a plurality of apertures 5. In the embodiment of FIG. 1 a number of drawers are shown in place but one of the drawers is removed exposing the aperture 5. Also, in this embodiment it is noted that the apertures may be of given size corresponding to the drawer size. The width and height of each of these apertures are correspondingly smaller than the front and back panels of the drawer, as shown in FIGS. 3 and 4 and discussed in detail hereinafter.

Also contained within the container and associated with the front doors or panels is a rack (not shown) having sections that register about the apertures and for accommodating guide rails to facilitate the guided movement of each of the drawers between a closed position and a fully extended position. This rack is preferably easily removable. The rack may be constructed from channel members or the like configuration of materials and may be attached together by screws or clamping devices. The rack is preferably secured inside of the refrigerator and forms a carrier for rails on which the drawers slide. In this regard it is noted in FIGS. 4 and 5 that the rear panel has slots 27 and 28 for accommodating these rails. The front panel may also be provided with similar slots although this is not necessary.

As mentioned previously, the front doors are provided with an optional number of apertures to accommodate drawers of size corresponding thereto. As mentioned previously also, the drawers have front and rear panels that are of larger size than each corresponding aperture. The different size drawers are adapted to accommodate different types of products that are to be stored. For example, drawers 6 and 7 shown in FIG. 1 are relatively large and, thus, may be used to accommodate cartons or bottles of milk and beverages. Furthermore, this storage can be provided with a very minimal space loss by making the drawer of substantially the same cross section as a particular common container such as a milk carton. In FIG. 1, drawers 8, 9 and 10 are smaller drawers and, thus, may accommodate smaller size products or items to again be stored with a very minimum loss in space. Other drawers, not specifically identified by reference character are also shown in FIG. 1.

As also depicted in FIG. 1, each drawer has an indentation 11 that essentially forms a handle permitting inward and outward motion of the drawer. Each drawer is also provided with a small frame 12 which may accommodate a card or label specifying the contents of the drawer.

A totally assembled drawer is shown in FIG. 5 while components thereof are shown in FIGS. 2-4 and 8. This drawer is constructed of three basic components including an insulated solid front panel 47, and insulated solid rear panel 48, and a screen basket 51. FIG. 3 depicts the inner side of the front panel while FIG. 4 depicts the inwardly facing side of the rear panel. Both of these panels are of substantially similar construction. Thus, with regard to the front panel 47, this may be constructed of two walls sandwiching an insulating material and having an external provision, as depicted in FIG. 1, for an indexing plate or label. The opposite side of the panel depicted in FIG. 3 also has, of course, the indentation 11 forming a handle. The inwardly facing side of the panel 47 as depicted in FIG. 3 has a peripheral indentation 13 for receiving a magnetized rubber gasket or seal 14. The inner dimensions of this seal or indentation may correspond with the aperture size. Also, on the same side of the panel there is provided a number of hooks 15-18. These hooks may be provided by partially punching out material from the inside wall. Preferably, the hooks 15 and 16 are longer than the hooks 17 and 18. Of course, there may be more or fewer hooks provided but preferably at least three such hooks.

The rear panel shown in FIG. 4 is also constructed of two walls sandwiching an insulating material. This panel also has a peripheral indentation 21 within which is disposed a magnetized rubber gasket or seal 22. Also shown in FIG. 4 are the hooks 23-26 similar to the hooks described previously with regard to the front panel. Again, the hooks 23 and 24 are somewhat longer than the hooks 25 and 26. The rear panel also has the openings and slots 27 and 28 through which rails 29 and 30, respectively, protude. In this regard, reference is made to FIG. 9 which shows the rails 29 and 30.

Between basket 51 constructed of a substantially open screen material having three sides 19, one of which forms a bottom. This screen material is supported by a more rigid structural material 20 forming a skeleton of the basket. This basket is essentially open on three sides, namely the front, rear and top. Of course, the front and rear sides will be sealed by the front and rear panels when connected with the screen basket. The screen material is provided so as to facilitate good air circulation through the container when the drawer is in its closed position.

Because the front and rear panels are both larger than their corresponding apertures, each of the drawers is assembled in the front doors or panels of the container. Thus, to assemble the drawer in its corresponding aperture, the back panel may be engaged through the corners of the aperture and may then be oriented so that the openings 27 and 28 fall on the rails 29 and 30. The rear panel may then be pulled toward the inside wall about the aperture. With the use of the magnetized rubber gasket on the back panel, the aperture is sealed. With the rear panel held against the aperture, then the perforated or screened container is disposed in a position so that it can be anchored therewith. Similarly, the front of the screened container is anchored with the front panel.

The assembly operation is relatively easy to perform. The reinforced upper bar 31 of the basket, is first engaged with the upper hooks, such as hooks 15 and 16, leaving a clearance for the bar 32 to slide into the bottom hooks, such as hooks 17 and 18. Both front and rear panels are secured to the basket in the same manner. Also, other types of securing means may be provided such as sheet metal screws. Furthermore, in order to disassemble the drawer, the reverse process is also quite easy. In this case, the drawer basket is slightly lifted in the hooks to free the bar 32. The operator then tilts the basket so as to disengage the bar 31 from the upper hooks.

The base support rods 33 and 34 of the basket container are adapted to lie on four rollers 35-38, as depicted in FIG. 9. In this regard, the rollers 35 and 36 are supported on the rail 29 and the rollers 37 and 38 are supported on the rail 30. In this way, the drawer can be rolled into the container up to an end position wherein the rubber gasket of the front panel seals the aperture and essentially seals the drawer in position. Similarly, when the drawer is fully extended, the gasket on the rear panel similarly seals on the inside surface adjacent to the aperture to also seal the container closed even though the drawer is open for taking or depositing items.

It is also preferred that the container be constructed so that the rails are tilted backward slightly so that when the drawers are released, they close automatically, or are closed by a slight touch of the drawer. Of course, some type of a light spring biasing may also be employed to release the drawers to a closed position when they are released by the operator.

FIG. 1 also shows the use of adjustable legs 39 and 40 which may be used to stabilize the position of the refrigerator. Furthermore, the automatic movement of the drawers previously described can be achieved by the simple adjustment of these front legs 39 and 40 so as to maintain the front of the container at a slightly elevated height in comparison with the rear of the container.

In FIG. 1, it may be assumed that the top door 2 is the freezer section of the refrigerator. In this case, a drawer, such as drawer 41 which is closely adjacent to the freezer, is built in the same manner as the rest of the drawers except that the perforated or screened walls are replaced by insulated, solid walls. A relatively small passageway may be provided coupling from the freezer to drawer 41. This allows cold air to penetrate to drawer 41 forming essentially an extension of the freezer. This drawer may be reserved for items frequently used such as ice cream which requires a lower temperature than the rest of the refrigerator. Furthermore, the demand for such items stored in this special drawer is much greater than for items stored in the freezer. Therefore, with this provision the opening of the main freezer door 2 occurs much less frequently and less warm air penetrates into the freezer, thus, saving energy by employing this relatively smaller freezer extending drawer 41.

It is noted in FIG. 1 that the upper door 2 is not provided with any apertures. In an alternate embodiment the door 2 could also be provided with apertures for accommodating drawers similar in construction to the drawers 6 and 7. However, with the drawless version, there is preferably provided an inside rack such as depicted in FIGS. 6, 7 and 10. The rack comprises one or more horizontal boards 42 which may be made from plastic or any other material. These boards have one or more grooves 43. The grooves may be provided, as shown in FIG. 7 on both top and bottom surfaces of the board 42. These grooves are preferably arranged in a manner so as not to weaken the board such as the staggered manner depicted in FIG. 7. There are also provided vertical boards 44. As depicted in FIG. 10, these boards have T-keys 45 and 46 which enable the boards 44 to mate with the grooves 43. Also, these boards 44 can be switched to different positions to adjust the size of the compartment defined between adjacent boards 44.

What is claimed is:

1. A compartmented container comprising;
   an insulated housing having a front member having adjacent doors including a freezer door associated with a freezer compartment and a food storage door associated with a food storage compartment, said food storage door having a plurality of apertures therethrough;
   a plurality of drawers;
   each said drawer being insertable through one of said apertures into the food storage compartment of said housing and being at least partially porous enabling air passage therethrough into the drawer; means for guiding the drawer, enabling movement thereof between closed and extended positions relative to the housing;
   at least one additional drawer disposed directly adjacent said freezer compartment and being insulated rather than porous
   and means in the housing demarcating the freezer and food storage compartments and defining therein at least one aperture to couple sub-freezing air from the freezer compartment to the said additional drawer to maintain the air in said additional drawer at or below freezing thereby forming essentially an extension of the freezer wherein may be stored such oftenly used items as ice cream,
   said additional drawer being insulated thus receiving substantially only sub-freezing air from the freezer compartment.

2. A compartmented container as set forth in claim 1 wherein each drawer has at least two perforated or porous sides and insulative front and rear panels.

3. A compartmented container as set forth in claim 2 further including means for sealing the drawer to the housing in both closed and extended positions thereof, wherein the means for sealing the drawer in both positions comprise gaskets or seals associated with the front and rear panels.

4. A compartmented container as set forth in claim 3 wherein the front panel gasket seals in the closed position of the drawer and the rear panel gasket seals in the extended position of the drawer.

5. A compartmented container as set forth in claim 1 wherein each drawer has front and rear panels having dimensions greater than their corresponding aperture.

6. A compartmented container as set forth in claim 5 wherein said drawer includes means defining a screen basket supported with open side and bottom between the front and rear panels.

7. A compartmented container as set forth in claim 5 wherein said front panel has index means for identifying the contents of the drawer.

8. A compartmented container as set forth in claim 5 including handle means for extending the drawer.

9. A compartmented container as set forth in claim 1 wherein the air is coupled unrestricted to the additional drawer via said aperture.

* * * * *